UNITED STATES PATENT OFFICE.

ASA P. MEYLERT, OF NEW BRITAIN, CONNECTICUT.

IMPROVEMENT IN PROCESSES OF PURIFYING CARBONIC-ACID GAS.

Specification forming part of Letters Patent No. 137,615, dated April 8, 1873; application filed November 4, 1872.

*To all whom it may concern:*

Be it known that I, ASA P. MEYLERT, of New Britain, in the State of Connecticut, have invented a new and Improved Process for the Purification of Carbonic-Acid Gas; and I declare the following to be a full, clear, and exact description thereof.

My process is based chiefly upon the affinity which the deutoxide of lead has for the sulphur compounds which constitute the principal impurities in carbonic-acid gas when obtained from the combustion of coal, coke, or other fuel; and consists in passing the gas as it issues from the furnace or generator through or over a mixture consisting of deutoxide of lead held in suspension in water or other liquid, whereby these impurities are removed.

The apparatus used by me for this purpose is an ordinary tank or cask closed air-tight, having an entrance and an exit pipe for the gases, the former pipe being made to dip beneath the surface of the liquid containing the purifying materials in solution, the latter pipe being inserted near the top of the tank to convey away the gases which have been forced through the purifying mixture. Any other suitable apparatus may, however, be used for this purpose.

A weak solution of acetate of lead, or a solution of some other soluble salt of lead, may be used instead of water in connection with deutoxide of lead, as described in the foregoing process.

What I claim as my invention, and desire to secure by Letters Patent of the United States, is—

The method of purifying carbonic-acid gas by the use of deutoxide of lead, substantially as described herein.

A. P. MEYLERT.

Witnesses:
T. L. MARVEL,
L. B. WILCOX.